US008766482B2

(12) United States Patent  (10) Patent No.: US 8,766,482 B2
Cook et al.  (45) Date of Patent: Jul. 1, 2014

(54) HIGH EFFICIENCY AND POWER TRANSFER IN WIRELESS POWER MAGNETIC RESONATORS

(75) Inventors: Nigel P. Cook, El Cajon, CA (US); Lukas Sieber, Fribourg (CH); Hanspeter Widmer, Wohlenschwill (CH)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 12/211,750

(22) Filed: Sep. 16, 2008

(65) Prior Publication Data

US 2009/0072629 A1  Mar. 19, 2009

Related U.S. Application Data

(60) Provisional application No. 60/973,166, filed on Sep. 17, 2007.

(51) Int. Cl.
    H01F 27/42   (2006.01)
    H01F 37/00   (2006.01)
    H01F 38/00   (2006.01)

(52) U.S. Cl.
    USPC ........................................................... 307/104

(58) Field of Classification Search
    USPC .................................. 307/104, 149; 320/108
    See application file for complete search history.

(56) References Cited

U.S. PATENT DOCUMENTS

| | | | |
|---|---|---|---|
| 4,088,999 A | 5/1978 | Fletcher et al. | |
| 5,982,139 A | 11/1999 | Parise | |
| 6,507,152 B2 | 1/2003 | Matsumoto et al. | |
| 7,068,991 B2* | 6/2006 | Parise | 455/343.1 |
| 7,154,451 B1 | 12/2006 | Sievenpiper | |
| 7,541,930 B2* | 6/2009 | Saarisalo et al. | 340/572.7 |
| 7,741,734 B2 | 6/2010 | Joannopoulos et al. | |
| 7,825,543 B2 | 11/2010 | Karalis et al. | |
| 2004/0134985 A1* | 7/2004 | Deguchi et al. | 235/451 |
| 2005/0127867 A1 | 6/2005 | Calhoon et al. | 320/108 |
| 2005/0131495 A1 | 6/2005 | Parramon et al. | 607/61 |
| 2007/0222542 A1 | 9/2007 | Joannopoulos | |
| 2008/0191897 A1 | 8/2008 | McCollough | 340/625.22 |
| 2008/0278264 A1* | 11/2008 | Karalis et al. | 333/219 |

FOREIGN PATENT DOCUMENTS

| | | |
|---|---|---|
| CN | 101682216 A | 3/2010 |
| JP | 2002078250 A | 3/2002 |
| JP | 2005261187 A | 9/2005 |
| JP | 2009501510 A | 1/2009 |
| JP | 2009524399 A | 6/2009 |
| WO | 2008118178 A1 | 10/2008 |

OTHER PUBLICATIONS

"Wireless Non-Radiative Energy Transfer", MIT paper, publication and date unknown, believed to be 2007.
"Efficient wireless non-radiative mid-range energy transfer", MITpaper, publication and date unknown, believed to be 2007.
"Wireless Power Transfer via Strongly Coupled Magnetic Resonances", Kurs et al, Science Express, Jun. 7, 2007.

(Continued)

Primary Examiner — Carlos Amaya
(74) Attorney, Agent, or Firm — Knobbe, Martens, Olson & Bear, LLP

(57) ABSTRACT

Techniques for wireless power transmission at levels that induce high power transfer and/or high efficiency of coupling.

21 Claims, 5 Drawing Sheets

(56) References Cited

OTHER PUBLICATIONS

"Wireless Power Transfer via Strongly Coupled Magnetic Resonances", Kurs et al, scimag.org, Jul. 6, 2007.
Dong-Gi Youn et al, "A Study on the Fundamental Transmission Experiment for Wireless Power Transmission System," 1999 IEEE Conference, TENCON 99, vol. 2, pp. 1419-1422, Sep. 1999.
International Search Report and Written Opinion-PCT/US2008/076559, International Search Authority—European Patent Office—Mar. 26, 2009.
James O. McSpadden et al, "A High Conversion Efficiency 5.8 GHz Rectenna," 1997 IEEE Microwave Symposium, vol. 2, pp. 547-550, Jun. 1997.
James O. McSpadden et al, "Theoretical and Experimental Investigation of a Rectenna Element for Microwave Power Transmission," 1992 IEEE Transactions on Microwave Theory and Techniques, vol. 40, pp. 2359-2366, Dec. 1992.
Naoki Shinohara et al, Experimental Study of Large Rectenna Array for Microwave.
Energy Transmission, 1998 IEEE Transactions on Microwave Theory and Techniques, vol. 46, pp. 261-268, Mar. 1998.
Tae-Whan Yoo et al, "Theoretical and Experimental Development of 10 and 35 GHz Rectennas," 1992 IEEE Transactions on Microwave Theory and Techniques, vol. 40, pp. 1259-1266, Jun. 1992.
Tsuyoshi Sekitani et al, "A Large-area Wireless Power-Transmission Sheet Using Printed Organic Transistors and Plastic MEMS Switches," Nature Materials Letter, pp. 413-417; Jan. 2007.
Kurs, et al., "Wireless Power Transfer via Strongly Coupled Magnetic Resonances", Jul. 6, 2007, Science, vol. 317 No. 5834, pp. 83-86, DOI: 10.1126/science 1143254.
Korean Office Action dated Jul. 31, 2012 in corresponding Application No. KR 2010-7008361, filed Sep. 16, 2008; 7 pages.

* cited by examiner

HIGH EFFICIENCY AND POWER TRANSFER IN WIRELESS POWER MAGNETIC RESONATORS

This application claims priority from provisional application No. 60/973,166, filed Sep. 17, 2007, the entire contents of which disclosure is herewith incorporated by reference.

BACKGROUND

It is desirable to transfer electrical energy from a source to a destination without the use of wires to guide the electromagnetic fields. A difficulty of previous attempts has been low efficiency together with an inadequate amount of delivered power.

Our previous applications and provisional applications, including, but not limited to, U.S. patent application Ser. No. 12/018,069, filed Jan. 22, 2008, entitled "Wireless Apparatus and Methods", the entire contents of the disclosure of which is herewith incorporated by reference, describe wireless transfer of power.

The system can use transmit and receiving antennas that are preferably resonant antennas, which are substantially resonant, e.g., within 5-10% of resonance, 15% of resonance, or 20% of resonance. The antenna(s) are preferably of a small size to allow it to fit into a mobile, handheld device where the available space for the antenna may be limited. An efficient power transfer may be carried out between two antennas by storing energy in the near field of the transmitting antenna, rather than sending the energy into free space in the form of a travelling electromagnetic wave. Antennas with high quality factors can be used. Two high-Q antennas are placed such that they react similarly to a loosely coupled transformer, with one antenna inducing power into the other. The antennas preferably have Qs that are greater than 1000.

SUMMARY

The present application describes transfer of energy from a power source to a power destination via electromagnetic field coupling with high efficiency and/or high power. Embodiments describe operations and actual efficiencies.

BRIEF DESCRIPTION OF THE DRAWINGS

These and other aspects will now be described in detail with reference to the accompanying drawings, wherein.

DETAILED DESCRIPTION

Figure 1:
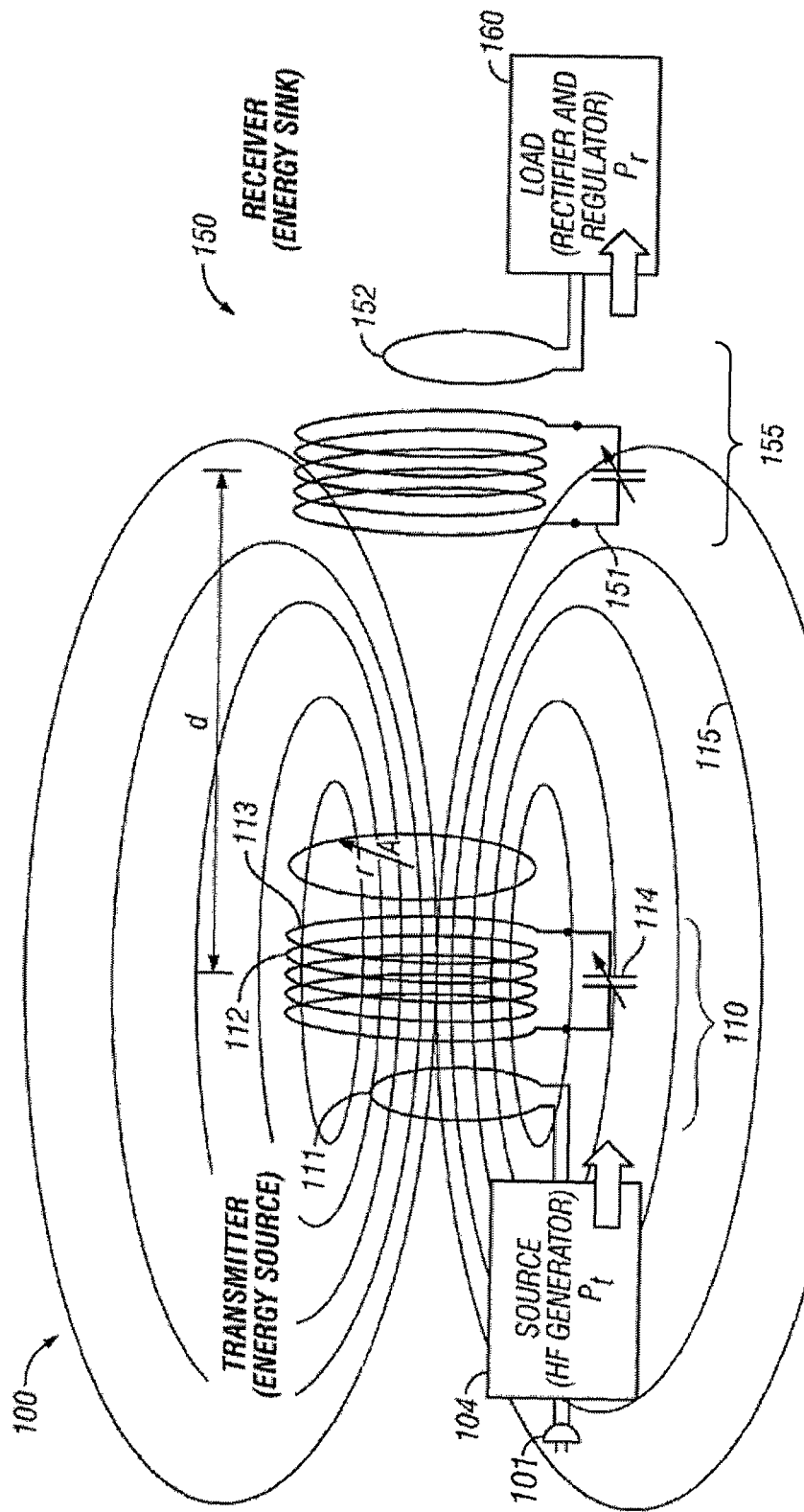
FIG. 1 shows a block diagram of a magnetic wave based wireless power transmission system.

A basic embodiment is shown in FIG. 1. A power transmitter assembly 100 receives power from a source, for example, an AC plug 101. A frequency generator 104 is used to couple the energy to an antenna 110, here a resonant antenna. The antenna 110 includes an inductive loop 111, which is inductively coupled to a high Q resonant antenna part 112. The resonant antenna includes a number N of coil loops 113 each loop having a radius $R_A$. A capacitor 114, here shown as a variable capacitor, is in series with the coil 113, forming a resonant loop. In the embodiment, the capacitor is a totally separate structure from the coil, but in certain embodiments, the self capacitance of the wire forming the coil can form the capacitance 114.

The frequency generator 104 can be preferably tuned to the antenna 110, and also selected for FCC compliance.

This embodiment uses a multidirectional antenna. 115 shows the energy as output in all directions. The antenna 100 is non-radiative, in the sense that much of the output of the antenna is not electromagnetic radiating energy, but is rather a magnetic field which is more stationary. Of course, part of the output from the antenna will in fact radiate.

Another embodiment may use a radiative antenna.

A receiver 150 includes a receiving antenna 155 placed a distance D away from the transmitting antenna 110. The receiving antenna is similarly a high Q resonant coil antenna 151 having a coil part and capacitor, coupled to an inductive coupling loop 152. The output of the coupling loop 152 is rectified in a rectifier 160, and applied to a load. That load can be any type of load, for example a resistive load such as a light bulb, or an electronic device load such as an electrical appliance, a computer, a rechargeable battery, a music player or an automobile.

The energy can be transferred through either electrical field coupling or magnetic field coupling, although magnetic field coupling is predominantly described herein as an embodiment.

Electrical field coupling provides an inductively loaded electrical dipole that is an open capacitor or dielectric disk. Extraneous objects may provide a relatively strong influence on electric field coupling. Magnetic field coupling may be preferred, since extraneous objects in a magnetic field have the same magnetic properties as "empty" space.

The embodiment describes a magnetic field coupling using a capacitively loaded magnetic dipole. Such a dipole is formed of a wire loop forming at least one loop or turn of a coil, in series with a capacitor that electrically loads the antenna into a resonant state.

Our previous applications have described the advantages of single turn loops being used as the resonators. The present application describes how two different single turn loops can be used to produce significantly increased range in a wireless power transmission system.

Figure 8:
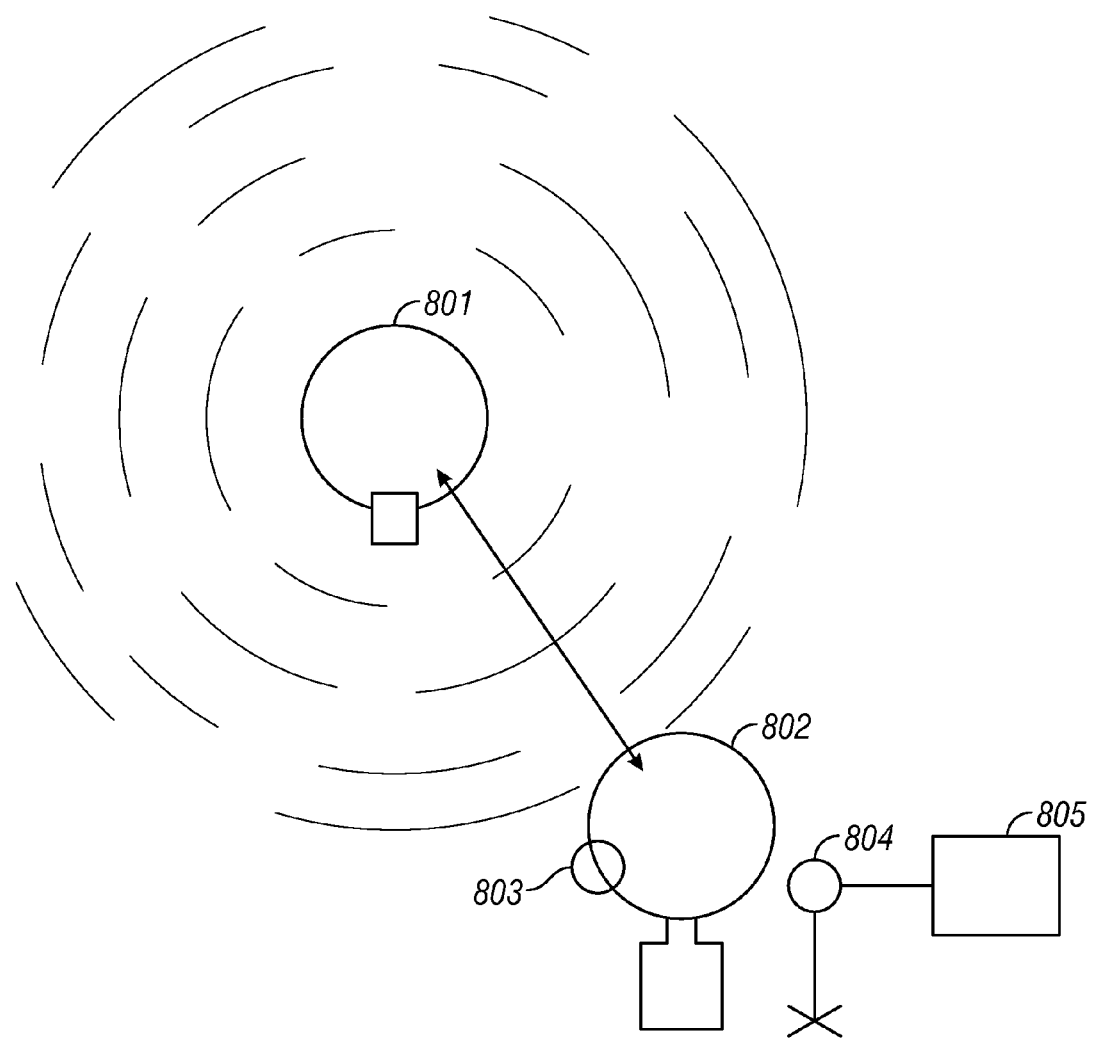
FIG. 8 illustrates an antenna measurement setup.

In the embodiment, a test was carried out using the test setup shown in FIG. 8. The transmitter 801 is a 45 cm diameter, 6 mm wire loop. The receiver is formed of a 40 cm×30 mm copper loop. It is noted that usually the receiver antenna should be smaller for purposes of packaging. As explained further herein, the test results are wholly reciprocal, thereby obviating any difference in received power.

The antenna 802 has a resonance frequency about 20 kHz lower than the antenna 801. A tuning loop 803 is used to shift a resonant frequency of the receiving antenna 802 to match a resonant frequency of the transmitting antenna 801. The signal is coupled to coupling loop 804 and to load 805.

Figure 2:
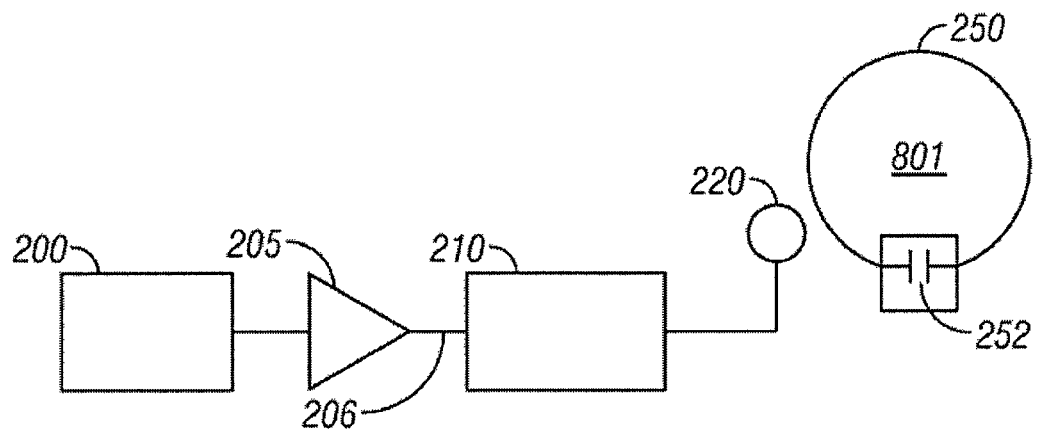
FIG. 2 illustrates a transmitter block diagram including amplifier coupling loop and antennas.

FIG. 2 illustrates a transmitter block diagram including amplifier coupling loop and antennas. In operation, an RF generator is used to create a 13.56 MHz continuous wave signal. An amplifier 205 provides a 50 dB amplification to produce the maximum power output of 25 W at 206. For purposes of the test, an analog power meter is used. The power is provided to a coupling loop 220 which is adjacent to and wirelessly coupled to the antenna 801 which is formed of a loop 250; and a capacitor 252 that brings the loop to resonance at 13.56 MHz.

Figure 3:
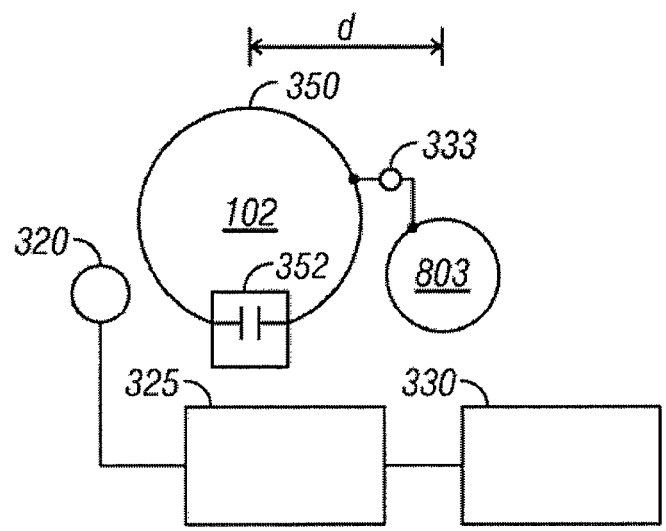
FIG. 3 illustrates a receiver block diagram including coupling loop, receiver and trends at tuning element.

FIG. 3 shows the receiver, including the receive loop 102 formed of an inductive loop 350 and capacitor 352, the tuning loop 803, and the coupling loop 320 which receives the power. A digital power meter 330 tests the amount of power that is received after attenuation by a 20 dB attenuator.

The receive side resonator loop combined with tuning loop acts like a 1:1 transformer with a low but adjustable coupling factor. The coupling factor is the distance between the main loop and tuning loop. A tuning loop may be considered as a secondary that produces a short circuit. The short circuit reduces the overall inductance of the resonator by a small fraction depending on the coupling factor thus increasing its resonance frequency without substantially decreasing the quality factor. The receive loop 102 and the tuning loop 803 may be connected to a carriage 333, which can move the two loops relative to one another. If a resonator which has a low inductance to capacitance ratio is used, it can be extremely effective.

Figure 4:
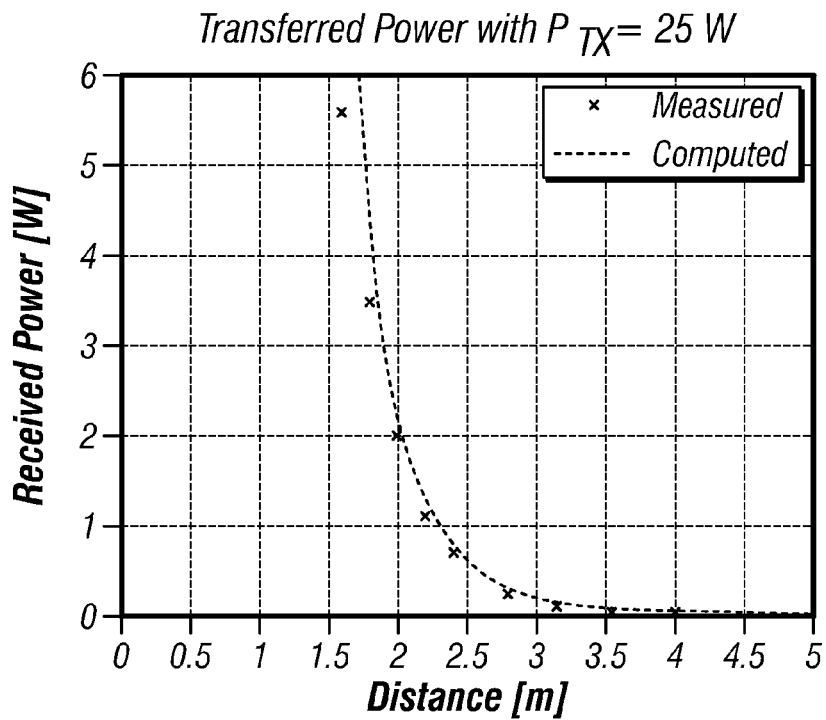
FIG. 4 illustrates the received power over distance.

FIG. 4 illustrates the received power over specified distances. According to this test, the distance was varied from 1.6 m to 4 m. Distances closer than 1.6 m were not measured, since the closer distances can cause detuning of the system. Hence, these values are interpolated, to avoid the detuning effects. Transition from near field into the far field occurs at about 3½ m at 13.56 MHz. This distance changes the preferred orientation from coaxial to coplanar, thereby affecting significantly the amount of power that can be received. FIG. 4 shows that at 3.5 m, the received power approaches 0 W because of this orientation variance.

At distances greater than 1.7 m, the calculated distance is closely related to the computed distance.

Figure 5:
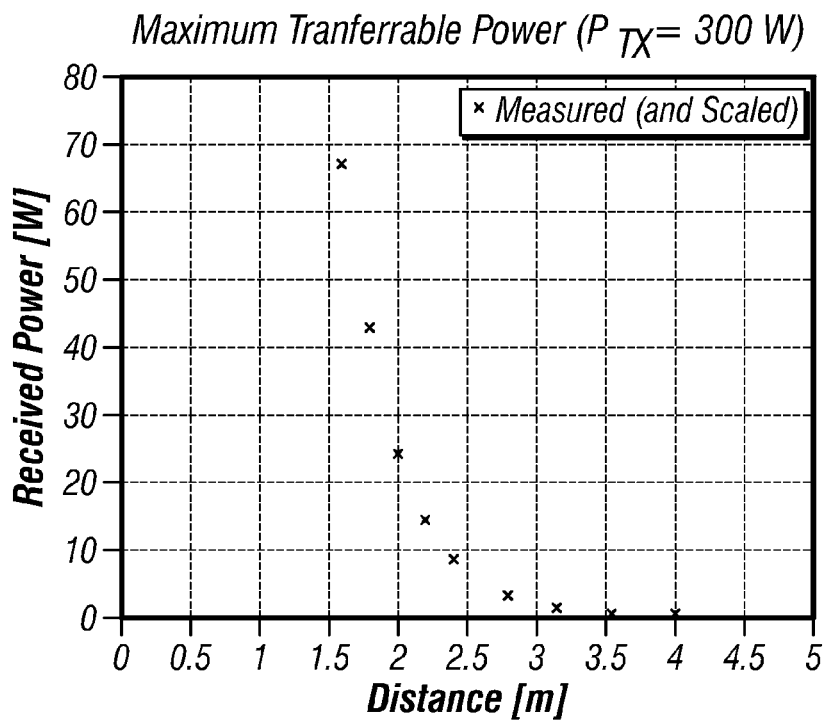
FIG. 5 illustrates the maximum transferable power over distance.

FIG. 5 illustrates the maximum transferable power. These antennas are highly linear, meaning that if the transmitter power is doubled, the receive power will also be doubled. The transmit loop is limited only by the voltage and current ratings of the capacitors; provided that there is sufficient cooling. The 30 mm copper loop uses a 200 pF capacitor with a limit of 9 kV peak and 100 amps carrying. That provides a transmit power of about 300 W.

Figure 6:
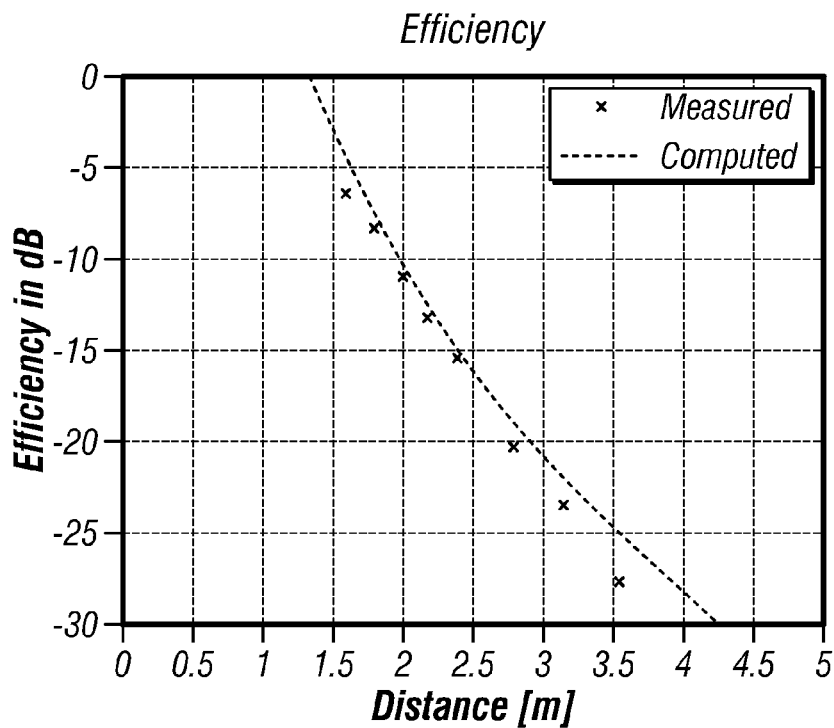
FIG. 6 illustrates the transfer efficiency over distance.
Figure 7:
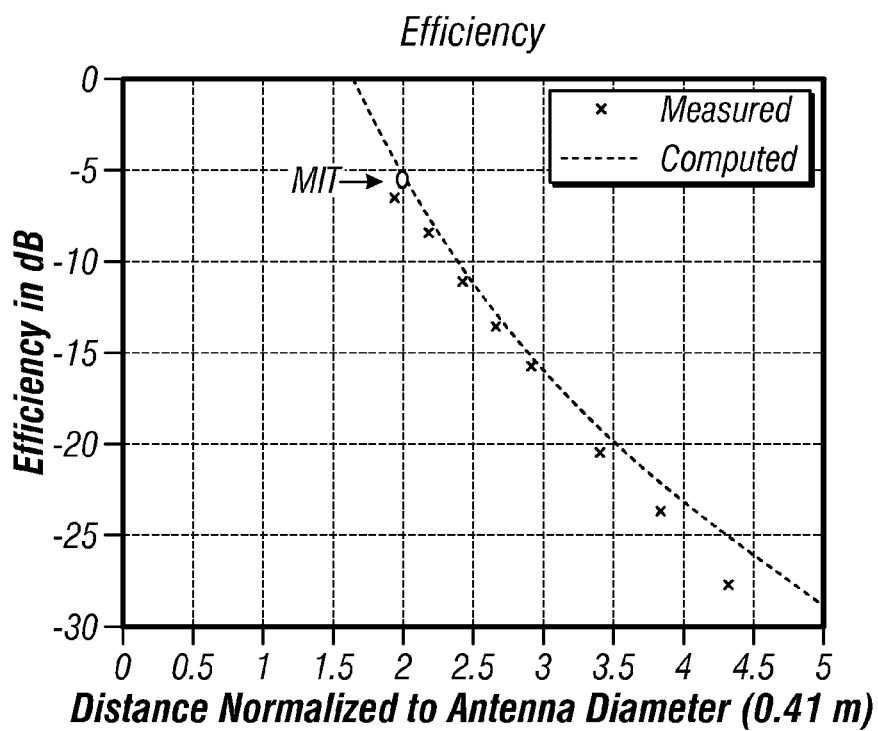
FIG. 7 illustrates the efficiency normalized to antenna diameter.

Because the system is linear, FIG. 5 shows data point scale to a transmit power of 300 W. This shows that the existing system can transfer 67 W at a distance of 1.6 m. The maximum radiation exposure limits recommended by ICNIRP would be exceeded by these levels. The transfer efficiency, however, is shown in FIG. 6, illustrating that the transfer efficiency is −15 dB for all distances less than 2½ m. FIG. 7 normalizes this distance to the antenna diameter. The tests performed by MIT are also shown in FIG. 7.

Conclusions are as follows. Except for the region closest to the near field border and at close distances, the antennas are highly linear, and power can simply be doubled to double the received power.

The system can operate with a transmit power of 25 W and a transfer efficiency of 25% over a distance of 1.5 m. The system is extremely stable with respect to resonance frequency and Q factor. The system can also power up to 70 W at a distance of 1.5 m. Extrapolation to smaller distances can also be possible.

Although only a few embodiments have been disclosed in detail above, other embodiments are possible and the inventors intend these to be encompassed within this specification. The specification describes specific examples to accomplish~more general goal that may be accomplished in another way. This disclosure is intended to be exemplary, and the claims are intended to cover any modification or alternative which might be predictable to a person having ordinary skill in the art. For example, other sizes, materials and connections can be used. Although the coupling part of the antenna is shown as a single loop of wire, it should be understood that this coupling part can have multiple wire loops. Other embodiments may use similar principles of the embodiments and are equally applicable to primarily electrostatic and/or electrodynamic field coupling as well. In general, an electric field can be used in place of the magnetic field, as the primary coupling mechanism.

Also, the inventors intend that only those claims which use the-words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A wireless power transmission system, comprising:
   a signal generator having a connection to a source of power and configured to generate a signal at a first frequency;
   a transmitting antenna configured to transmit power to a receiving antenna to power a load via an electromagnetic field at the first frequency and based on the signal generated by said signal generator, and
   a tuning loop being electrically isolated from the load, the tuning loop being movable relative to the receiving antenna to substantially match a resonant frequency of the receiving antenna and a resonant frequency of the transmitting antenna to improve power transfer therebetween.

2. The system of claim 1, wherein said transmitting antenna transmits power of 25 W.

3. The system of claim 1, wherein said transmitting antenna is a capacitively coupled dipole, and said receiving antenna is a capacitively coupled dipole.

4. The system of claim 1, further comprising a coupling loop, on the transmitting antenna, coupled directly to said signal generator and unconnected by any wire connection to said transmitting antenna.

5. The system of claim 1, further comprising a coupling loop, on the receiving antenna, coupled between an electrical circuit and said receiving antenna, such that said electrical circuit is not directly connected by any wire to said receiving antenna.

6. The system as in claim 1, wherein said transmitting antenna and said receiving antenna are both capacitively coupled.

7. The system of claim 1, wherein the size of the receiving antenna is significantly greater than that of the tuning loop.

8. The system of claim 1, wherein the tuning loop is configured to increase the resonant frequency of the receiving antenna to substantially match the resonant frequency of the transmitting antenna.

9. A wireless power receiver, comprising:
   a receiving antenna configured to receive power to power a load via an electromagnetic field generated by a transmitting antenna, the receiving antenna operationally coupled to a tuning loop that is electrically isolated from the load, the tuning loop being movable relative to the receiving antenna to substantially match a resonant frequency of the receiving antenna and a resonant frequency of the transmitting antenna to improve power transfer therebetween.

10. The receiver of claim 9, further comprising a coupling loop coupled to the receiving antenna via a wireless field.

11. The receiver of claim 9, wherein the receiving antenna is a capacitively coupled dipole.

12. The receiver of claim 9, wherein the device further comprises: an electrical circuit coupled to the load; and a coupling loop coupled between said electrical circuit and said receiving antenna such that said electrical circuit is not directly connected by any wire to said receiving antenna.

13. A method of transmitting power, the method comprising:
generating a signal at a first radio frequency;
outputting power at a transmit power level with a transmit antenna, via an electromagnetic field, at the first radio frequency;
transferring the power to a receive antenna to power a load; and
moving a tuning loop relative to the receive antenna to substantially match a resonant frequency of the receive antenna and a resonant frequency of the transmit antenna to improve power transfer therebetween, the tuning loop being operationally coupled to the receive antenna and electrically isolated from the load.

14. The method of claim 13, wherein the transmit power level is approximately 25 W.

15. The method of claim 13, further comprising transferring power to a second receiver within a region defined by a distance within substantially 1.5 meters of the transmit antenna, and wherein the transfer efficiency is greater than 25%.

16. A wireless power transmission system, comprising:
means for generating a signal at a first radio frequency;
means for outputting power at a transmit power level, via a wireless field, at the first radio frequency to a receiving antenna to power a load; and
means for tuning electrically isolated from the load, the tuning means being movable relative to the receiving antenna to substantially match a resonant frequency of the receiving antenna and a resonant frequency of the power outputting means to improve power transfer therebetween.

17. The system of claim 16, wherein the signal generating means comprises a signal generator, the power outputting means comprises a transmit antenna, and the tuning means comprises a tuning loop.

18. A method of receiving power, the method comprising:
receiving, with a receive antenna, power transmitted by a transmit antenna via an electromagnetic field to power a load, the receive antenna operationally coupled to a tuning loop that is electrically isolated from the load, the tuning loop being movable relative to the receive antenna to substantially match a resonant frequency of the receive antenna and a resonant frequency of the transmit antenna to improve power transfer therebetween; and
powering the load with the received power.

19. A device for receiving power, the device comprising:
means for receiving power transmitted by a transmit antenna via an electromagnetic field to power a load, the power receiving means operationally coupled to means for tuning loop that is electrically isolated from the load, the tuning means being movable relative to the power receiving means to substantially match a resonant frequency of the power receiving means and a resonant frequency of the transmit antenna to improve power transfer therebetween; and
means for powering the load with the received power.

20. The device of claim 19, wherein the power receiving means comprises a receive antenna, wherein the tuning means comprises a tuning loop and wherein the load powering means comprises an electrical circuit.

21. A wireless power transmission system, comprising:
a tuning loop operationally coupled to a transmitting antenna configured to transfer power and a receiving antenna configured to power a load based on the transferred power, the tuning loop being electrically isolated from the load, the tuning loop being movable relative to the receiving antenna to substantially match a resonant frequency of the receiving antenna and a resonant frequency of the transmitting antenna to improve power transfer therebetween.

* * * * *